(12) United States Patent
Fukuda et al.

(10) Patent No.: US 8,586,184 B2
(45) Date of Patent: Nov. 19, 2013

(54) FLUORINE-CONTAINING POLYMER AND AQUEOUS TREATMENT AGENT

(75) Inventors: Teruyuki Fukuda, Settsu (JP); Akihiko Ueda, Settsu (JP); Shigeru Maruyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 293 days.

(21) Appl. No.: 12/747,352

(22) PCT Filed: Dec. 11, 2008

(86) PCT No.: PCT/JP2008/073028
§ 371 (c)(1),
(2), (4) Date: Jun. 10, 2010

(87) PCT Pub. No.: WO2009/075387
PCT Pub. Date: Jun. 18, 2009

(65) Prior Publication Data
US 2010/0261020 A1   Oct. 14, 2010

Related U.S. Application Data

(60) Provisional application No. 61/013,585, filed on Dec. 13, 2007.

(51) Int. Cl.
*B32B 27/06* (2006.01)

(52) U.S. Cl.
USPC ......... 428/421; 526/245; 524/544; 427/393.6

(58) Field of Classification Search
USPC ......... 428/421; 526/245; 524/544; 427/393.6
See application file for complete search history.

(56) References Cited

U.S. PATENT DOCUMENTS

| | | | |
|---|---|---|---|
| 4,147,851 A | | 4/1979 | Raynolds |
| 4,366,299 A | | 12/1982 | Dessaint |
| 4,366,300 A | * | 12/1982 | Delescluse .................. 526/245 |
| 4,592,930 A | * | 6/1986 | Schmidt et al. ............... 427/133 |
| 5,798,415 A | | 8/1998 | Corpart et al. |
| 6,037,429 A | * | 3/2000 | Linert et al. .................. 526/243 |
| 6,113,978 A | | 9/2000 | Ornstein et al. |
| 2007/0219331 A1 | | 9/2007 | Ishikawa et al. |

FOREIGN PATENT DOCUMENTS

| | | | |
|---|---|---|---|
| CN | 1942494 A | | 4/2007 |
| EP | 0 195 714 A1 | | 9/1986 |
| FR | 2 476 097 A1 | | 8/1981 |
| JP | 06-122870 | * | 5/1994 |
| JP | 6-122870 A | | 5/1994 |
| JP | 08-225620 | * | 9/1996 |
| JP | 08-225620 A | | 9/1996 |
| JP | 2002-524645 A | | 8/2002 |
| JP | 2007-156093 A | | 6/2007 |
| JP | 2007-302800 A | | 11/2007 |
| JP | 2007-316448 A | | 12/2007 |

OTHER PUBLICATIONS

"Preliminary Risk Assessment of the Developmental Toxicity Associated With Exposure to Perfluorooctanoic Acid and Its Salts", Apr. 10, 2003, 61 pages, http://www.epa.gov/opptintr/pfoa/pfoara.pdf.
Federal Register, Apr. 16, 2003, pp. 18626-18633, vol. 68, No. 73, http://www.epa.gov/opptintr/pfoa/pfoafr.pdf.
EPA Environmental News for Release: Monday Apr. 14, 2003 EPA Intensifies Scientific Investigation of a Chemical Processing Aid, Apr. 14, 2003, 2 pages http://www.epa.gov/opptintr/pfoa/pfoaprs.pdf.
EPA Oppt Fact Sheet, Apr. 14, 2003, 3 pages, http://www.epa.gov/opptintr/pfoa/pfoafacts.pdf.

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

Disclosed is a fluorine-containing polymer having (A) repeating units derived from a fluorine-containing acrylate monomer, and (B) repeating units derived from an amino group-containing monomer, wherein the fluorine-containing polymer is water-soluble. The fluorine-containing polymer has sufficiently high solubility, and can impart high water repellency, high oil repellency and high soil resistance to a porous substrate.

3 Claims, No Drawings

FLUORINE-CONTAINING POLYMER AND AQUEOUS TREATMENT AGENT

CROSS-REFERENCE TO RELATED APPLICATIONS

This Application claims benefit under 35 U.S.C. §119(e) of U.S. Provisional Application No. 61/013,585 filed Dec. 13, 2007, incorporated herein by reference in its entirety.

TECHNICAL FIELD

The present invention relates to a fluoroacrylate polymer which has an amino group-containing polymerizable compound for the purpose of imparting water- and oil-repellency and soil resistance to a porous substrate having micropores such as stone, tile and concrete.

BACKGROUND ART

Aqueous treatment agents of the copolymer, which is a fluorine-containing copolymer comprising repeating units derived from a fluoroacrylate having a long chain Rf group having at least 8 carbon atoms and further comprising an amino group-containing component polymerizable compound, is already known as a treatment agent for a fiber (for example, U.S. Pat. No. 4,147,851). In the case of the fiber, the fiber has easy penetration of treatment agent in comparison with substrates having microstructure such as stones, and if the stability as the treatment agent is kept, practical use is possible and solubility in water is not required. JP-A-8-225620 discloses a method of improving a polymer containing long chain Rf having at least 6 carbon atoms by means of isocyanate crosslink. This proposed method is essentially different from the present invention of improving penetration into minute porous substrate. JP-T-2002-524645 proposes a method of treating asphalt materials by using a copolymer containing a long chain Rf group. In this treatment agent, substrates are limited to the substrate having easy penetration of the treatment agent, which is an asphalt material. The addition of a water-soluble auxiliary solvent has been practically needed in order to penetrate, into of fine pores, an aqueous solution treatment agent of a copolymer containing a long chain Rf group.

Described below are the environmental problems raised by perfluorooctanoic acid (PFOA).

The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] have taught that PFOA (perfluorooctanoic acid), one of long chain fluoroalkyl compounds, is proved to have a danger to burden the environment. Under such a situation, EPA announced on Apr. 14, 2003 that the scientific investigation on PFOA should be more intensively executed.

On the other hand, the Federal Register (FR Vol. 68, No. 73/Apr. 16, 2003 [FRL-7303-8], http://www.epa.gov/opptintr/pfoa/pfoafr.pdf), EPA Environmental News FOR RELEASE: MONDAY Apr. 14, 2003 EPA INTENSIFIES SCIENTIFIC INVESTIGATION OF A CHEMICAL PROCESSING AID (http://www.epa.gov/opptintr/pfoa/pfoaprs.pdf) and EPA OPPT FACT SHEET Apr. 14, 2003 (http://www.epa.gov/opptintr/pfoa/pfoafacts.pdf) have published that telomers have a possibility to produce PFOA when decomposed or metabolized (herein, the telomer means a long chain fluoroalkyl group), and also that telomers have been widely used in foam fire extinguishers, care products, washing materials, carpets, textiles, paper, leather, etc., in order to impart water and oil repellency and soil resistance to them.

A conventionally mentioned product comprising a fluorine-containing copolymer containing Rf group having at least 8 carbon atoms increasingly has a problem of containing PFOA and PFOA-like material having bioaccumulation characteristics.

Accordingly, the prompt convert to a fluorine-containing polymer comprising a fluoroacrylate having at most 6 carbon atoms in short-chain Rf group, and the development of a fluorine-containing polymer having the improved affinity with other materials and skin are required.

Patent Document 1: U.S. Pat. No. 4,147,851
Patent Document 2: JP-A-8-225620
Patent Document 3: JP-T-2002-524645

DISCLOSURE OF THE INVENTION

Problems to be Solved by the Invention

An object of the invention is to provide a fluorine-containing polymer (or fluorine-containing copolymer) having sufficiently high solubility in water, which can impart high water-repellency, high oil-repellency and high soil resistance to a porous substrate.

Means for Solving the Problems

The present invention provides a fluorine-containing polymer comprising:
(A) repeating units derived from a fluorine-containing acrylate monomer, and
(B) repeating units derived from an amino group-containing monomer,
wherein the fluorine-containing polymer is water-soluble.

Effects of the Invention

The fluorine-containing polymer of the present invention characteristically has enough solubility in water required for penetration of an effective component into fine pores, because a short chain fluoroalkyl group having at most 7 carbon atoms, particularly at most 6 carbon atoms is possessed. The fluorine-containing polymer of the present invention has sufficiently high solubility in water, and can impart high water repellency, high oil repellency and high soil resistance to a porous substrate.

BEST MODE OF CARRYING OUT THE INVENTION

In present invention, the "acrylate monomer" means an acrylate having a hydrogen atom at an alpha-position and, additionally, an acrylate wherein a hydrogen atom at the alpha-position is substituted with a methyl group or a substituent such as a halogen atom.

In the fluorine-containing polymer, examples of the fluorine-containing monomer (A) include a monomer having
(i) at least one fluorine-containing group selected from the group consisting of a fluoroalkyl group, a fluoroalkenyl group and a fluoroether group (hereinafter referred to as "fluorine-containing group"), and
(ii) an unsaturated group of the formula:

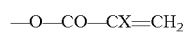

wherein X is a hydrogen atom, an alkyl group having 1 to 6 carbon atoms, a fluorine atom, a chlorine atom, a bromine atom, an iodine atom, a $CFX^1X^2$ group (in which $X^1$ and $X^2$ are each a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group.

The acrylate monomer having the fluorine-containing group is, for example, represented by the formula:

$$CH_2=C(-X)-C(=O)-O-Y-Rf \quad (I)$$

wherein X is a hydrogen atom, an alkyl group having 1 to 6 carbon atoms, a fluorine atom, a chlorine atom, a bromine atom, an iodine atom, a $CFX^1X^2$ group (in which $X^1$ and $X^2$ are each a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group, Y is a direct bond, an aliphatic group having 1 to 10 carbon atoms which optionally has an oxygen atom, an aromatic, cycloaliphatic or araliphatic group having 6 to 10 carbon atoms which optionally has an oxygen atom, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group), and Rf is a linear or branched fluoroalkyl group having 1 to 7 carbon atoms, a linear or branched fluoroalkenyl group having 2 to 7 carbon atoms, or a fluoroether group having totally 1 to 200 repeating units selected from the group consisting of the repeating units: —$C_3F_6O$—, —$C_2F_4O$— and —$CF_2O$—.

When the Rf group in the formula (I) is a fluoroalkyl group, the Rf group is preferably a perfluoroalkyl group. The Rf group has 1 to 7 carbon atoms. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, —$(CF_2)_4CF(CF_3)_2$, —$(CF_2)_2H$, —$CF_2CFHCF_3$, —$(CF_2)_4H$ and —$(CF_2)_6H$. When the Rf group is the fluoroalkyl group, the carbon atom number of the Rf group is from 1 to 7, for example, from 2 to 6, particularly from 4 to 6, especially 6, from the viewpoint of the above-mentioned PFOA and function.

When the Rf group is the fluoroalkenyl group, examples of the Rf group include —$CF=CF(CF_3)$, —$CF=C(CF_3)_2$, —$CF=C(CF_3)(CF_2CF_2CF_3)$, —$CF=C(CF_3)(CF(CF_3)_2)$, —$C(CF_3)=CF(CF(CF_3)_2)$ and —$C(CF_2CF_3)=C(CF_3)_2$. When the Rf group is the fluoroalkenyl group, the carbon atom number of the Rf group is preferably from 2 to 7, particularly from 3 to 6, especially 6.

In the case of the fluoroether group, the Rf group has at least one type of repeating unit (oxyperfluoroalkylene group) selected from the group consisting of —$C_3F_6O$—, —$C_2F_4O$— and —$CF_2O$— group in the fluoroether group. —$C_3F_6O$— is —$CF_2CF_2CF_2O$— or —$CF_2C(CF_3)FO$—. Generally, —$C_2F_4O$— is —$CF_2CF_2O$—. The total number of oxyperfluoroalkylene repeating units is preferably from 1 to 200, for example, from 1 to 100, especially from 5 to 50. The fluoroether group has an end group directly bonding to the oxyperfluoroalkylene repeating unit. Examples of the end group include a hydrogen atom, a halogen atom (for example, a fluorine atom), an alcohol group (for example, $HOCH_2$—), an epoxy group (for example),

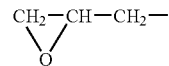

an amine group (for example, $H_2N$—), a carboxylic acid group (for example, HOOC—), an acid halide group (for example, F(O=)C—) and a chloromethyl group ($ClH_2C$—). The fluoroether group may have a fluoroalkylene group having 1 to 10 (preferably 1 to 3) carbon atoms, particularly a perfluoroalkylene group, in addition to the oxyperfluoroalkylene repeating unit and the end group. Examples of the fluoroalkylene group having 1 to 10 carbon atoms include —$CF_2$— and —$CF_2CF_2$—.

Examples of the fluoroether group (in particular, the perfluoroether group) included in examples of the Rf group are as follows:

$$F-(CF_2CF_2CF_2O)_n-CF_2CF_2-$$

(n is 1-200)

$$F-(CF_2C(CF_3)FO)_n-CF_2CF_2-$$

(n is 1-200)

$$F-(CF_2C(CF_3)FO)_n-(CF_2O)_m-CF_2CF_2-$$

(total of n and m is 1-200)

$$F-(CF_2CF_2O)_n-(CF_2O)_m-CF_2CF_2-$$

(total of n and m is 1-200)

Y is a direct bond, an aliphatic group having 1 to 10 carbon atoms which optionally has an oxygen atom, an aromatic, cycloaliphatic or araliphatic group having 6 to 10 carbon atoms which optionally has an oxygen atom, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group). The aliphatic group is preferably an alkylene group (having particularly 1 to 4, for example, 1 or 2 carbon atoms). The aromatic or cycloaliphatic group may be substituted or unsubstituted.

Examples of the above-mentioned fluorine-containing monomer (A) include the following:

Rf-$(CH_2)_{10}OCOCH=CH_2$
Rf-$(CH_2)_{10}OCOC(CH_3)=CH_2$
Rf-$CH_2OCOCH=CH_2$
Rf-$CH_2OCOC(CH_2)=CH_2$
Rf-$(CH_2)_2OCOCH=CH_2$
Rf-$(CH_2)_2OCOC(CH_3)=CH_2$
Rf-$SO_2N(CH_3)(CH_2)_2OCOCH=CH_2$
Rf-$SO_2N(C_2H_5)(CH_2)_2OCOCH=CH_2$
Rf-$CH_2CH(OCOCH_3)CH_2OCOC(CH_3)=CH_2$
Rf-$CH_2CH(OH)CH_2OCOCH=CH_2$

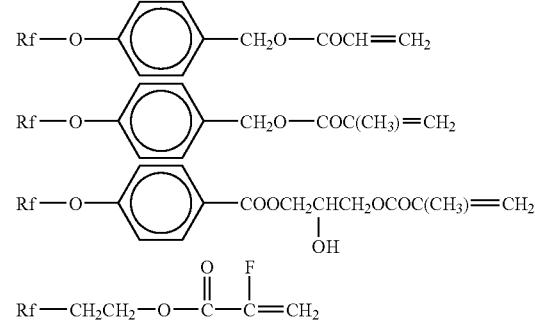

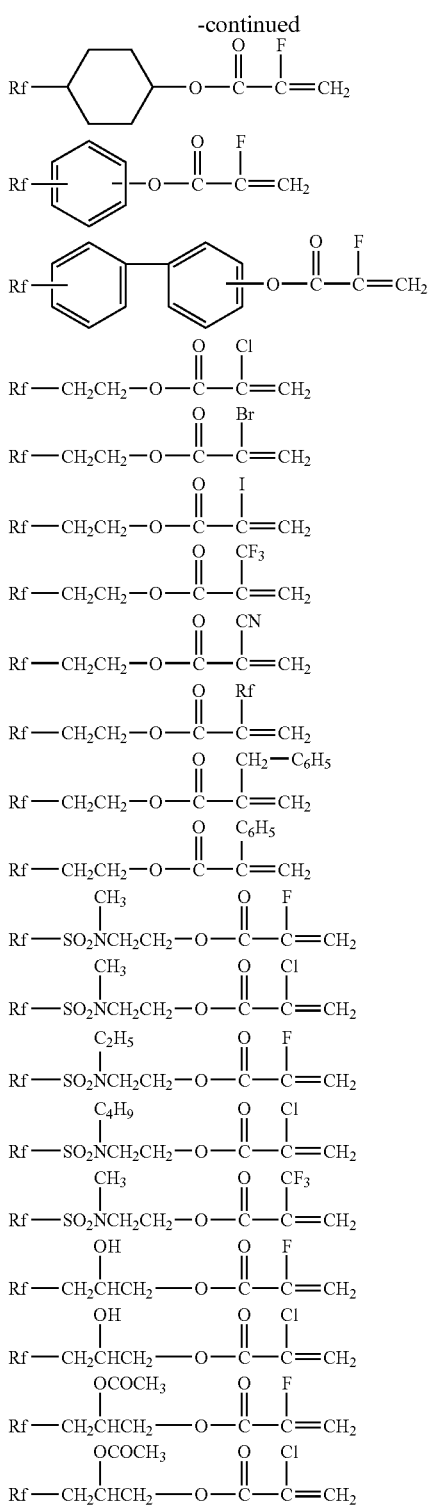

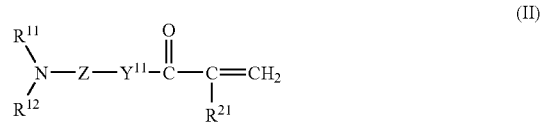

wherein Rf is a linear or branched fluoroalkyl group having 1 to 7 carbon atoms, a fluoroalkenyl group having 2 to 7 carbon atoms, or a fluoroether group having totally 1 to 200 repeating units selected from the group consisting of the repeating units: —$C_3F_6O$—, —$C_2F_4O$— and —$CF_2O$—.

The amino group-containing monomer (B) is a compound having an amino group and a carbon-carbon double bond. The amino group-containing monomer (B) is preferably fluorine-free.

Examples of the amino group-containing monomer (B) include a compound of the formula:

$$\underset{R^{12}}{\overset{R^{11}}{N}}-Z-Y^{11}-\underset{R^{21}}{\overset{O}{C}}-C=CH_2 \quad (II)$$

wherein
$R^{11}$, $R^{12}$ and $R^{21}$ are, the same or different, a hydrogen atom, or an alkyl group having 1 to 4 carbon atoms,
$Y^{11}$ is an oxygen atom or NH, and
Z is a linear or branched alkylene group having 1 to 10 carbon atoms; and
$R^{11}$ and $R^{12}$ may bond each other to form a ring together with an adjacent nitrogen atom.

The fluorine-containing polymer contains the amino group. For example, when the fluorine-containing polymer is together with a proton acid to form a salt which dissolves in water and dissociates, cation characteristics are exhibited.

Each of $R^{11}$, $R^{12}$ and $R^{21}$ is a hydrogen atom or an alkyl group having 1 to 4 carbon atoms (for example, methyl, ethyl, propyl and butyl). $R^{21}$ is preferably a hydrogen atom or a methyl group. Each of $R^{11}$, $R^{12}$ and $R^{21}$ may contain a heteroatom such as a nitrogen atom, an oxygen atom and a sulfur atom. When $R^{11}$ and $R^{12}$ bond each other to form a ring together with the adjacent nitrogen atom, $R^{11}$ and $R^{12}$ may bond through a heteroatom such as a nitrogen atom, an oxygen atom and a sulfur atom. Examples of the ring formed by $R^{11}$ and $R^{12}$ which bond each other together with the adjacent nitrogen atom include an aziridine ring, a pyrrolidine ring, a piperidine ring, a piperazine ring and a morpholine ring.

Examples of the alkylene group, which stands for Z, include a linear or branched alkylene group having 1 to 6 carbon atoms (preferably 1 to 4 carbon atoms) such as a methylene group, an ethylene group, a propylene group, a trimethylene group, a tetramethylene group and a hexamethylene group.

Specific examples of the amino group-containing monomer (B) include:
compounds wherein $Y^{11}$ is an oxygen atom in the chemical formula (II), such as dimethylaminomethyl (meth)acrylate, dimethylaminoethyl (meth)acrylate, diethylaminoethyl (meth)acrylate, dimethylaminopropyl (meth)acrylate and diethylaminopropyl (meth)acrylate; and
compounds wherein $Y^{11}$ is NH in the chemical formula (II), such as dimethylaminoethyl (meth)acrylamide and dimethylaminopropyl (meth)acrylamide. The amino group-containing monomer (B) can be used alone or in combination of at least two.

The monomer constituting the fluorine-containing polymer may contain a fluorine-free hydrophilic monomer (C) in addition to the monomers (A) and (B). The fluorine-free hydrophilic monomer (C) has hydrophilicity, and does not contain a fluorine atom.

The fluorine-free hydrophilic monomer (C) has at least one hydrophilic group. Examples of the hydrophilic group include a nonionic group such as an oxyalkylene group.

The fluorine-free hydrophilic monomer (C) may be a monomer having the hydrophilic group which is an oxyalkylene group (having 2 to 6 carbon atoms, preferably 2 to 3 carbon atoms in alkylene groups) and a carbon-carbon double bond.

The hydrophilic group which is the oxyalkylene group is nonionic. The number of oxyalkylene group in the fluorine-free hydrophilic monomer (C) may be from 2 to 200, preferably 3 to 50, especially 4 to 30.

Examples of the fluorine-free hydrophilic monomer (C) include polyalkylene glycol mono(meth)acrylate and polyalkylene glycol di(meth)acrylate.

A molecular weight of the fluorine-free hydrophilic monomer (C) may be at least 100, for example, at least 150, particularly at least 200, especially from 250 to 3000. The upper limit of the molecular weight of the fluorine-free hydrophilic monomer (C) may be 2000, for example, 1000.

The polyalkylene glycol mono(meth)acrylate is preferably of the general formula:

$$CH_2=CX^1C(=O)-O-(RO)_n-X^2 \qquad (III)$$

wherein $X^2$ is a hydrogen atom or a methyl group,
$X^2$ is a hydrogen atom or an unsaturated or saturated hydrocarbon group having 1 to 22 carbon atoms,
R is an alkylene group having 2 to 6 carbon atoms, and
n is an integer of 2 to 90.

"n" is may be particularly from 3 to 30, for example, from 4 to 20.

The R group in the general formula (III) is preferably an ethylene group.

The R group in the general formula (III) may be a combination of at least two alkylene groups. In such case, at least one of the R group is preferably an ethylene group. The combination of the R groups include a combination of ethylene group/propylene group and a combination of ethylene group/butylene group.

The fluorine-free hydrophilic monomer (C) may be a mixture of at least two. In such case, in at least one of the fluorine-free hydrophilic monomers (C), the R group in the general formula (III) is preferably the ethylene group.

Specific examples of the fluorine-free hydrophilic monomer (C) include the following, to which the fluorine-free hydrophilic monomer (C) is not limited.
$CH_2=CX^1COO-(CH_2CH_2O)_n-H$
$CH_2=CX^1-(CH_2CH_2O)_n-CH_3$
$CH_2=CX^1COO-(CH_2CH(CH_3)O)_n-H$
$CH_2=CX^1COO-(CH_2CH(CH_3)O)_n-CH_3$
$CH_2=CX^1COO-(CH_2CH_2O)_5-(CH_2CH(CH_3)O)_2-H$
$CH_2=CX^1COO-(CH_2CH_2O)_5-(CH_2CH(CH_3)O)_3-CH_3$
$CH_2=CX^1COO-(CH_2CH_2O)_8-(CH_2CH(CH_3)O)_6-CH_2CH(C_2H_5)C_4H_9$
$CH_2=CX^1COO-(CH_2CH_2O)_{23}-OOC(CH_3)C=CH_2$
$CH_2=CX^1COO-(CH_2CH_2O)_{20}-(CH_2CH(CH_3)O)_5-CH_2-CH=CH_2$ The fluorine-containing polymer may contain another monomer (D) in addition to the monomers (A), (B) and (C). The other monomer (D) is preferably a fluorine-free monomer. Examples of the other monomers (D) include a hydrocarbon group-containing monomer, ethylene, vinyl acetate, vinyl halide (for example, vinyl chloride), vinylidene halide (for example, vinylidene chloride), acrylonitrile, 2-hydroxyethyl (meth)acrylate, 2-hydroxypropyl (meth)acrylate, glycerol mono(meth)acrylate, tetrahydrofurfuryl (meth)acrylate, 3-chloro-2-hydroxypropyl (meth)acrylate, vinyl alkyl ketone, vinyl alkyl ether, isoprene, chloroprene and butadiene, but are not limited to these.

The other examples of the other monomer (D) include a monomer having a silane group. The monomer having a silane group is preferably a compound having a silane group (particularly, an end silane group) and a carbon-carbon double bond. A monomer having a silane group may be a monomer having an end silane coupling agent (or group) or a side chain silane coupling agent (or group).

Specific examples of the monomer having a silane group are as follows:
$CH_2=CHCO_2(CH_2)_3Si(OCH_3)_3$,
$CH_2=CHCO_2(CH_2)_3Si(OC_2H_5)_3$,
$CH_2=C(CH_3)CO_2(CH_2)_3Si(OCH_3)_3$ (γ-methacryloxypropyltrimethoxysilane),
$CH_2=C(CH_3)CO_2(CH_2)_3Si(OC_2H_5)_3$,
$CH_2=CHCO_2(CH_2)_3SiCH_3(OC_2H_5)_2$,
$CH_2=C(CH_3)CO_2(CH_2)_3SiC_2H_5(OCH_3)_2$,
$CH_2=C(CH_3)CO_2(CH_2)_3Si(CH_3)_2(OC_2H_5)$,
$CH_2=C(CH_3)CO_2(CH_2)_3Si(CH_3)_2OH$,
$CH_2=CHCO_2(CH_2)_3SiCH_3[ON(CH_3)C_2H_5]_2$,
$CH_2=C(CH_3)CO_2(CH_2)_3SiC_6H_5[ON(CH_3)C_2H_5]_2$,
$CH_2=CHSi(OCH_3)_3$,
$CH_2=CHSi(OC_2H_5)_3$,
$CH_2=CHSiCH_3(OCH_3)_2$,
$CH_2=CHSi(CH_3)_2(OC_2H_5)$,
$CH_2=CHSi(CH_3)_2SiCH_3(OCH_3)_2$,
$CH_2=CHSiCH_3[ON(CH_3)C_2H_5]_2$,
vinyltrichlorosilane, and
vinyltris(2-methoxyethoxy)silane.

The weight-average molecular weight of the fluorine-containing polymer may be, for example, from 1,000 to 1,000,000, particularly from 2,000 to 100,000, especially from 4,000 to 20,000. The weight-average molecular weight of the fluorine-containing polymer can be measured by GPC (gel permeation chromatography) (in terms of polystyrene).

The fluorine-containing polymer dissolves in water. The solubility (amount of the fluorine-containing polymer which can dissolve in 100 g of water at 25° C.) of the fluorine-containing polymer may be at least 5 g, for example, at least 10 g, particularly at least 20 g. The upper limit of the solubility may be 500 g, for example, 200 g.

The fluorine-containing polymer may comprise a combination of repeating units derived from the following monomers.
(1) Monomer (A)+Monomer (B)
(2) Monomer (A)+Monomer (B)+Monomer (C)
(3) Monomer (A)+Monomer (B)+Monomer (D)
(4) Monomer (A)+Monomer (B)+Monomer (C)+Monomer (D)

In the fluorine-containing polymer, the amount of the monomer (B) may be 1 to 500 parts by weight, for example, 2 to 100 parts by weight, particularly 3 to 80 parts by weight, especially 5 to 70 parts by weight,
the amount of the monomer (C) may be 0 to 10 parts by weight, for example, 1 to 5 parts by weight,
the amount of the monomer (D) may be 0 to 10 parts by weight, for example, 1 to 5 parts by weight,
based on 100 parts by weight of the monomer (A).

The fluorine-containing polymer of the present invention can be prepared by any of conventional polymerization methods. Conditions for polymerization reaction can be arbitrarily selected. Such polymerization method includes a solution polymerization, a suspension polymerization and an emulsion polymerization. The solution polymerization is particularly preferable.

In a solution polymerization, there can be used a method of dissolving the monomer(s) into an organic solvent in the presence of a polymerization initiator, replacing the atmosphere by nitrogen, and stirring the mixture with heating at the temperature within the range from 50° C. to 120° C. for 1 hour to 10 hours. Examples of the polymerization initiator include azobisisobutyronitrile, azobisisovaleronitrile, benzoyl peroxide, di-tert-butyl peroxide, lauryl peroxide, cumene hydroperoxide, t-butyl peroxypivalate and diisopropyl peroxydicarbonate.

The polymerization initiator may be used in the amount within the range from 0.01 to 5 parts by weight, based on 100 parts by weight of the monomers.

The organic solvent is inert to the monomer(s) and dissolves the monomer(s), and examples thereof include pentane, hexane, heptane, octane, isooctane, cyclohexane, benzene, toluene, xylene, petroleum ether, a commercial petroleum solvent (EXXSOL D40 and ISOPER E manufactured by Exxon Mobil Corp.), tetrahydrofuran, 1,4-dioxane, acetone, methyl ethyl ketone, methyl isobutyl ketone, methyl acetate, ethyl acetate, butyl acetate, t-butyl acetate, isopropyl alcohol, isopropanol, propyleneglycol methyl ether acetate, p-chlorobenzotrifluoride, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 1,000 parts by weight, based on 100 parts by weight of total of the monomers.

After polymerization reaction, water is added to the reaction mixture, and an aqueous solution of the polymer can be obtained by removing an organic solvent (for example, by distillation).

In present invention, the treatment agent (for example, a water- and oil-repellent agent or a soil resistant agent) comprises (1) the fluorine-containing polymer and (2) a liquid medium, namely water, or a mixture of water with a water-soluble organic solvent. Examples of the water-soluble organic solvent include an alcohol such as methanol, ethanol, n-propanol and isopropanol; and a ketone such as acetone. The amount of the water-soluble organic solvent may be at most 50% by weight, for example, 1 to 30% by weight, based on the mixture (a total of water and the water-soluble organic solvent).

The treatment agent is preferably in the form of a solution (for example, an aqueous solution) of the fluorine-containing polymer.

In the treatment agent, the amount of fluorine-containing polymer is not particularly limited and may be selected from the range which can homogeneously dissolve the fluorine-containing polymer. For example, the amount of the fluorine-containing polymer may be from 0.1 to 50% by weight, for example, 0.2 to 20% by weight, particularly 0.5 to 10% by weight, based on the treatment agent.

The treatment liquid of the present invention may contain (3) an additive, in addition to the fluorine-containing polymer (1) and the liquid medium (2). Examples of the additive (3) include a silicon-containing compound, a wax and an acrylic emulsion. The silicon-containing compound is preferably a compound having at least one siloxane linkage. Generally, the silicon-containing compound is a compound except the monomer having a silane group.

Examples of the silicon-containing compound include an alkyl silicate and siliconate.

Examples of the alkyl silicate include a compound represented by the following general formula (I):

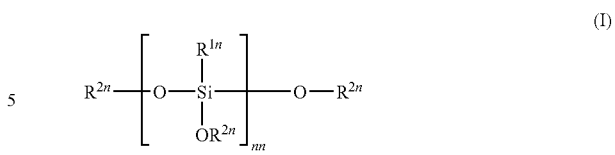

wherein $R^{1n}$ is an alkyl group having 1 to 18 carbon atoms and, when nn is 2 or more, each of the $R^{1n}$ groups may be the same or different;

$R^{2n}$ is a hydrogen atom or an alkyl group having 1 to 5 carbon atoms and, when nn is 2 or more, each of the $R^{2n}$ groups may be the same or different; and nn is an integer of 1 to 20.

The alkyl group having 1 to 18 carbon atoms (that is, a saturated aliphatic hydrocarbon group) as represented by $R^{1n}$ is not particularly restricted. Examples of the alkyl group includes a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group and an octadecyl group. The alkyl group may be linear or branched.

The alkyl group having 1 to 5 carbon atoms as represented by $R^{2n}$ is not particularly restricted but includes, among others, a methyl group, an ethyl group, a propyl group, a butyl group and a pentyl group, which may be linear or branched.

The symbol nn represents an integer of 1 to 20, for example, an integer of 1 to 10.

Specific examples of the alkyl silicate includes methyltrimethoxysilane, ethyltrimethoxysilane, propyl-trimethoxysilane, butyltrimethoxysilane, pentyltrimethoxy-silane, hexyltrimethoxysilane, heptyltrimethoxysilane, octyltrimethoxysilane, nonyltrimethoxysilane, decyl-trimethoxysilane, undecyltrimethoxysilane, dodecyl-trimethoxysilane, tridecyltrimethoxysilane, tetradecyl-trimethoxysilane, pentadecyltrimethoxysilane, hexadecyl-trimethoxysilane, heptadecyltrimethoxysilane, octadecyl-trimethoxysilane, methyltriethoxysilane, ethyltriethoxysilane, propyltriethoxysilane, butyltriethoxysilane, pentyltriethoxysilane, hexyltriethoxysilane, heptyl-triethoxysilane, octyltriethoxysilane, nonyltriethoxysilane, decyltriethoxysilane, undecyltriethoxysilane, dodecyl-triethoxysilane, tridecyltriethoxysilane, tetradecyl-triethoxysilane, pentadecyltriethoxysilane, hexadecyl-triethoxysilane, heptadecyltriethoxysilane and octadecyl-triethoxysilane. Among them, methyltrimethoxysilane, methyltriethoxysilane, hexyltriethoxysilane and octyltriethoxysilane are preferred.

Also, a dimer of the silicon-containing compound can be used as the silicon-containing compound. Examples of said dimer include compounds wherein nn is 2 or 3 in the general formula (I) standing for the alkyl silicate. Furthermore, compounds wherein nn is at most 20 may be used as well.

Examples of the siliconate (in particular, alkyl siliconate) include a compound of the formula:

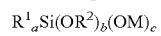

wherein a is an integer of 0 or more (preferably 1),
b is an integer of 0 or more (preferably 2),
c is an integer of 1 or more (preferably 1),
provided that a+b+c=4 is satisfied,
$R^1$ each is, the same or different, a hydrocarbon group having 1 to 18 carbon atoms,
$R^2$ each is, the same or different, a hydrogen atom or a hydrocarbon group having 1 to 18 carbon atoms, and
M each is, the same or different, an alkali metal.

The hydrocarbon group is, for example, an aliphatic hydrocarbon group (for example, an alkyl group), an alicyclic hydrocarbon group, an aromatic hydrocarbon group or an aralphatic hydrocarbon group.

Examples of $R^1$ include a methyl group, an ethyl group, a propyl group, an isopropyl group, a n-butyl group, an isobutyl group, a t-butyl, a n-pentyl group, an isopentyl group, a neopentyl group, a t-pentyl group, a n-hexyl group, a n-heptyl group, a n-octyl group, an isooctyl group, a 2,2,4-trimethylpentyl group, a n-nonyl group, a n-decyl group, a n-dodecyl group, a n-octadecyl group, a cyclopentyl group, a cyclohexyl group, a cycloheptyl group, a methyl cyclohexyl group, a phenyl group, a naphtyl group, an anthryl group, a phenanthryl group, a tolyl group, a xylyl group, an ethylphenyl group, a benzyl group and a phenylethyl group. Among these, the methyl group, the ethyl group and the propyl group are preferable, and the methyl group is particularly preferable.

Examples of $R^2$ include a hydrogen atom and the same groups mentioned for the $R^1$ group. Among these, the hydrogen atom, the methyl group and the ethyl group are preferable, and the hydrogen atom is particularly preferable.

Examples of M include Li, Na and K. Particularly, Na is preferable.

Specific examples of the alkyl siliconate include sodium methyl siliconate [$CH_3Si(OH)_2(ONa)$] and potassium ethyl siliconate [$C_2H_5Si(OH)(OK)$].

The amount of the additive (3) may be from 0 to 200 parts by weight, for example, from 0 to 50 parts by weight, e.g., from 0.1 to 50 parts by weight, based on 100 parts by weight of the fluorine-containing polymer (1).

Still further, the treatment agent may contain another water-repellent agent, another oil-repellent agent, a dry speed regulator, a crosslinking agent, a film formation auxiliary, a compatibilizer, a surfactant, an antifreezing agent, a viscosity regulator, an ultraviolet ray absorber, an antioxidant, a pH regulator, an antifoaming agent, a sliding regulator, an antistatic agent, a hydrophilizing agent, an antimicrobial, a preservative, an insect repellent, a fragrance, a fire retardant and/or a color regulator in addition to the components (1)-(3), if necessary.

In the present invention, the treatment agent is coated on the substrate so that the water- and oil-repellency and soil releasability are imparted to the substrate.

The porous substrate include masonry such as stones, glass, ceramics, textiles, paper, wood, leather, metal and plastics. Examples of masonry include stone, brick, concrete and tile. Examples of stone include natural stone (for example, marble and granite), and artificial stone.

The masonry is treated by applying (coating) the treatment agent to the substrate. The amount of the treatment agent may be such that the fluorine-containing polymer contained in the treatment agent is 0.05 to 50 g/m², for example, 0.1 to 20 g/m², preferably 1 to 10 g/m². The coating may be conducted once or a plurality of times. The coating method may be any of, for example, brushing, spraying, rolling, dipping and use of a waste cloth containing the treatment agent. The excess amount of the treatment agent may be wiped off according to the necessity. Then the treatment agent is dried to remove the liquid medium. The drying may be conducted at room temperature (20° C.), and/or the baking may be conducted at 80° C. to 250° C.

The "treatment" means that a treatment agent is applied to a substrate by, for example, immersion, spraying or coating. The treatment gives the result that the fluorine-containing polymer which is an active component of the treatment agent is adhered to surfaces of the substrate and/or penetrated into internal parts of the substrate.

EXAMPLES

Examples and Comparative Examples are shown as follows so that present invention is illustrated, but these are only specific examples of the present invention, and the present invention is not limited to these. In the followings, % is % by weight, unless specified otherwise.

In the following, a test was made as follows:

Soil Resistance Test

A soil was put on a treated substrate, and droplet(s) was left for 24 hours and wiped off with a paper towel. The visual evaluation was conducted according to the following criteria.
1: Deep stain, and oil droplet widely spread
2: Deep stain, and slight or no oil droplet spread
3: Moderate stain, and no spread
4: Slight stain
5: No stain.

Preparative Example 1

Preparation of Aqueous Solution of "Rf(C6)-DM" Polymer $CF_3CF_2—(CF_2CF_2)_2—CH_2CH_2OCOC(CH_3)=CH_2$ [Rf(C6)methacrylate] (73.30 g), dimethylaminoethyl methacrylate (DM) (26.70 g), isopropanol (IPA) (150.00 g) were stirred in a four-necked flask to dissolve these with stirring, and maintained at 60° C. while substituting nitrogen. t-Butyl peroxypivalate (2 g) was added to perform the reaction at 60° C. for 6 hours to give a polymer solution. The completion of the polymerization reaction was confirmed to have the conversion 99% or more of the monomer by gas chromatography. Even more particularly, while stirring this polymer solution at 60° C., a mixture of $CH_3COOH$ (acetic acid) (10.20 g) and deionized water (300 g) was added dropwise. IPA was removed under reduced pressure. The resultant was diluted with deionized water so that a solid content, which was determined from an evaporation residue after having heated this solution at 130° C. for 1 hour, became 25% by weight, to give a transparent and stable aqueous solution of polymer.

Preparative Example 2 [Rf(C4)C1-DM] and Preparative Example 3 [Rf(C2)-DM]

In Preparative Example 2, the same manner as in Preparative Example 1 was repeated except that Rf(C6) methacrylate and DM were replaced with $CF_3CF_2CF_2CF_2—CH_2CH_2OCOC(Cl)=CH_2$ [Rf(C4)chloroacrylate] (63.00 g) and DM (37.00 g), respectively.

Also, in Preparative Example 3, the same manner as in Preparative Example 1 was repeated except that Rf(C6) methacrylate and DM were replaced with $CF_3CF_2—CH_2OCOC(CH_3)=CH_2$ [Rf(C2)methacrylate] (59.62 g) and DM (40.38 g), respectively.

Comparative Preparative Example 1

Rf(Cn)-DM

In Comparative Preparative Example 1, the same manner as in Preparative Example 1 was repeated except that Rf(C6) methacrylate and DM were replaced with $CF_3CF_2—(CF_2CF_2)_n—CH_2CH_2OCOC(CH_3)=CH_2$ [n: mixture of 3, 4 and 5, Rf(Cn)-DM] (77.20 g) and DM (22.80 g).

Example 1

The aqueous solution of polymer prepared in Preparative Example 1 was diluted in deionized water so that a solid content became 3% by weight to give a treatment liquid.

The treatment liquid was applied on the surface of a polished porous substrate (1 ml of the treatment liquid per an area of 5 cm×10 cm), excess treatment liquid was wiped off after leaving at room temperature for 10 minutes. After left at room temperature for 24 hours, a soil resistance test was conducted.

As the porous substrate, (1) granite (G613 mined in China, jet burner processing), (2) granite (G613 mined in China, polishing finish), (3) marble (Bianco Carrara, polishing finish) and (4) limestone (moca cream, water polishing) were used.

Results are shown in Tables 1 to 4.

Example 2, Example 3 and Comparative Example 1

The same procedure as in Example 1 was repeated except that a polymer prepared in Preparative Example 2 (Example 2), Preparative Example 3 (Example 3) or Comparative Preparative Example 1 (Comparative Example 1) was used.

Results are shown in Tables 1 to 4.

TABLE 1

| (1) Granite (JB) | Prep. Example 1 | Prep. Example 2 | Prep. Example 3 | Com. Prep. Example 1 |
| --- | --- | --- | --- | --- |
| 1. Olive oil | 5 | 5 | 5 | 4 |
| 2. Salad oil | 4 | 4 | 4 | 3 |
| 3. Spicy oil | 5 | 4 | 4 | 3 |
| 4. Motor oil | 4 | 4 | 3 | 3 |
| 5. Red wine | 5 | 4 | 4 | 3 |
| 6. Coffee | 5 | 5 | 5 | 4 |
| 7. Blue ink | 3 | 3 | 3 | 3 |
| 8. Gargle | 4 | 4 | 4 | 3 |
| Total | 35 | 33 | 32 | 26 |

TABLE 2

| (2) Granite (polishing finish) | Prep. Example 1 | Prep. Example 2 | Prep. Example 3 | Com. Prep. Example 1 |
| --- | --- | --- | --- | --- |
| 1. Olive oil | 5 | 4 | 4 | 2 |
| 2. Salad oil | 5 | 4 | 4 | 2 |
| 3. Spicy oil | 5 | 4 | 4 | 3 |
| 4. Motor oil | 4 | 4 | 3 | 2 |
| 5. Red wine | 5 | 4 | 4 | 3 |
| 6. Coffee | 5 | 5 | 5 | 3 |
| 7. Blue ink | 3 | 3 | 3 | 2 |
| 8. Gargle | 4 | 4 | 3 | 2 |
| Total | 36 | 32 | 30 | 19 |

TABLE 3

| (3) Marble (polishing finish) | Prep. Example 1 | Prep. Example 2 | Prep. Example 3 | Com. Prep. Example 1 |
| --- | --- | --- | --- | --- |
| 1. Olive oil | 5 | 5 | 5 | 3 |
| 2. Salad oil | 5 | 5 | 5 | 3 |
| 3. Spicy oil | 5 | 5 | 5 | 3 |
| 4. Motor oil | 5 | 5 | 4 | 2 |
| 5. Red wine | 4 | 4 | 4 | 2 |
| 6. Coffee | 5 | 5 | 5 | 3 |

TABLE 3-continued

| (3) Marble (polishing finish) | Prep. Example 1 | Prep. Example 2 | Prep. Example 3 | Com. Prep. Example 1 |
| --- | --- | --- | --- | --- |
| 7. Blue ink | 3 | 3 | 3 | 2 |
| 8. Gargle | 4 | 4 | 3 | 2 |
| Total | 36 | 36 | 34 | 20 |

TABLE 4

| (4) Limestone (polishing finish) | Prep. Example 1 | Prep. Example 2 | Prep. Example 3 | Com. Prep. Example 1 |
| --- | --- | --- | --- | --- |
| 1. Olive oil | 5 | 5 | 5 | 3 |
| 2. Salad oil | 5 | 5 | 5 | 3 |
| 3. Spicy oil | 5 | 5 | 5 | 3 |
| 4. Motor oil | 5 | 5 | 4 | 2 |
| 5. Red wine | 4 | 4 | 4 | 2 |
| 6. Coffee | 5 | 5 | 5 | 3 |
| 7. Blue ink | 3 | 3 | 3 | 2 |
| 8. Gargle | 4 | 4 | 3 | 2 |
| Total | 36 | 36 | 34 | 20 |

The invention claimed is:

1. A masonry treatment agent consisting essentially of:
   (1) a fluorine-containing polymer, and
   (2) a liquid medium,
   wherein the masonry treatment agent is in the form of a solution, and
   wherein the fluorine-containing polymer comprises:
   (A) repeating units derived from a fluorine-containing acrylate monomer, and
   (B) repeating units derived from an amino group-containing monomer,
   wherein the fluorine-containing polymer is water-soluble, and
   the fluorine-containing acrylate monomer (A) is of the formula:

$$CH_2=C(-X)-C(=O)-O-Y-Rf \quad (I)$$

wherein X is a hydrogen atom, an alkyl group having 1 to 6 carbon atoms, a fluorine atom, a chlorine atom, a bromine atom, an iodine atom, a $CFX^1X^2$ group (in which $X^1$ and $X^2$ are each a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group,
   Y is a direct bond, an aliphatic group having 1 to 10 carbon atoms which optionally has an oxygen atom, an aromatic, cycloaliphatic or araliphatic group having 6 to 10 carbon atoms which optionally has an oxygen atom, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group), and
   Rf is a linear or branched fluoroalkyl group having 1 to 7 carbon atoms, a linear or branched fluoroalkenyl group having 2 to 7 carbon atoms, or a fluoroether group having totally 1 to 200 repeating units selected from the group consisting of the repeating units: —$C_3F_6O$—, —$C_2F_4O$— and —$CF_2O$—.

2. The treatment agent according to claim 1, wherein the liquid medium (2) is:
   (i) water, or
   (ii) a mixture of water with a water-soluble organic solvent.

3. The treatment agent according to claim 1, which is used for treatment of masonry.

\* \* \* \* \*